Patented July 13, 1937

2,087,202

UNITED STATES PATENT OFFICE 2,087,202

WELD ROD

Anthony G. de Golyer, New York, N. Y., assignor to Vulcan Alloy Corporation, a corporation of Delaware No Drawing. Application March 4, 1937, Serial No. 128,927

2 Claims. (Cl. 219—8)

This invention relates to a new ferrous base alloy containing molybdenum, tungsten and boron in the form of a weld rod for the production of welded surfaces or sections characterized by extremely high degree of hardness, resistance to abrasion and resistance to deformation under impact.

In many industrial operations it is desirable to apply a facing or inlay of hard, wear resistant metal to parts of machinery or other equipment exposed to excessive abrasion or impact. Various alloys and materials have been proposed for this purpose. All of such heretofore suggested compositions contain high percentages of alloy elements, together with materially more than 1% of carbon. Weld metal deposited with such compositions may have relatively high hardness, i. e. 500 Brinell, but all of such deposits are extremely brittle and consequently are not suitable for use on surfaces exposed to impact or shock.

The object of the present invention is to provide an alloy which may be readily deposited by fusion welding, particularly with the electric arc, and which produces weld metal having relatively high strength, high resistance to deformation under impact, unusually high hardness and extremely high resistance to abrasive wear.

I have found that an alloy composed of molybdenum 15% to 25%, tungsten 3% to 12%, boron 1% to 3.50%, nickel 2% to 10% and the balance substantially iron possesses high hardness, high impact strength and is remarkably resistant to abrasive wear when deposited by means of welding. Weld metal deposited with the electric arc method has a hardness of from 725 to more than 800 Brinell.

A distinctive and valuable advantage of the present alloy is that when it is applied by fusion welding a true welded bond is formed with the base metal. The present alloy may be readily welded on steel of any carbon content and virtually all types of alloy steels, including 14% manganese steel. The unusual combination of physical properties and characteristics possessed by this alloy render it particularly valuable for facing or rebuilding surfaces of equipment exposed to conditions combining abrasive wear and impact such, for example, as tools for cutting rock, coal, etc., or equipment for grinding or pulverizing ores, minerals and other materials.

The essential components of my alloy are molbydenum, tungsten, boron, nickel and iron. Experiments I have made indicate that the alloy possesses in combination the desired physical properties and characteristics only when the essential components are present within the following percentages: Molybdenum 15% to 25%, tungsten 3% to 12%, boron 1% to 3.50%, nickel 2% to 10% and the remainder principally iron. It will be understood that small amounts of manganese, silicon or other elements may be present as impurities incidental to manufacture. It should be understood, however, that the percentages of any of such incidental impurities should be restricted to amounts which will not be adversely effective on the physical properties or characteristics of the alloy.

One distinctive advantage of the present alloy is that it makes possible the production, by welding, of deposits having unusually high hardness and remarkable resistance to abrasive wear without the presence of large amounts of carbon, i. e. 1% or higher, which invariably render alloys of molybdenum, tungsten and iron extremely brittle. I have found that the presence of appreciable amounts of boron, in combination with the other essential components of the alloy, result in the production of weld deposits which are not only hard, e. g. 780 Brinell or higher, but which are also remarkably tough, i. e. resistant to failure under impact.

Although I usually prefer to have the present alloy substantially free from carbon, I have found that certain of the base materials used in the commercial manufacture of the alloy usually contain varying amounts of carbon, and consequently the alloy will generally contain minor percentages of carbon in the nature of an impurity incidental to manufacture. It is essential to restrict the amount of carbon to a maximum of approximately 0.75%, as materially greater amounts embrittle the composition and render it virtually useless for a large number of industrial applications.

As specific examples alloys within the scope of the present invention, which I have found to be particularly suitable for deposition by welding of hard, abrasive resistant surfaces are the following: molybdenum 18%, tungsten 9%, boron 2%, nickel 4.50%, carbon 0.25% and the balance substantially iron; molybdenum 20%, tungsten 9%, boron 2.35%, nickel 6%, carbon 0.45% and the balance substantially iron.

The present alloy cannot be forged or otherwise mechanically worked but it can be readily cast into rods or other shapes.

I wish to explain that in the present alloy molybdenum and tungsten are not equivalents but that each of these elements performs certain definite functions, and in order to produce an alloy having in combination approximately the maximum values of the desired physical properties and characteristics, both molybdenum and tungsten must be present within the limits specified herein. Furthermore, the percentage of molybdenum should generally be at least approximately twice the percentage of tungsten.

I claim:

1. A weld rod comprising a metallic composition containing molybdenum 15% to 25%, tungsten 3% to 12%, boron 1% to 3.50%, nickel 2% to 10% and the remainder substantially iron.

2. A weld rod comprising a metallic composition containing molybdenum 15% to 25%, tungsten 3% to 12%, boron 1% to 3.50%, nickel 2% to 10%, carbon up to a maximum of approximately 0.75% and the remainder substantially iron.

ANTHONY G. DE GOLYER.